(12) United States Patent
Oe et al.

(10) Patent No.: US 8,314,378 B2
(45) Date of Patent: Nov. 20, 2012

(54) APPARATUS AND METHOD FOR MANUFACTURING LIGHT SOURCE DEVICE

(75) Inventors: Shinichi Oe, Tokyo (JP); Kazutaka Ikeda, Tokyo (JP); Akira Nakamura, Tokyo (JP); Takayuki Yanagisawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 416 days.

(21) Appl. No.: 12/782,745

(22) Filed: May 19, 2010

(65) Prior Publication Data

US 2011/0119899 A1    May 26, 2011

(30) Foreign Application Priority Data

Nov. 26, 2009   (JP) .................................. 2009-268774

(51) Int. Cl.
*H01L 21/66* (2006.01)
*G02F 1/37* (2006.01)
(52) U.S. Cl. .................... 250/252.1; 250/491.1; 438/16; 438/27; 257/E33.056
(58) Field of Classification Search .............. 250/252.1, 250/491.1; 438/16, 27; 257/E33.056
See application file for complete search history.

(56) References Cited

FOREIGN PATENT DOCUMENTS

| JP | 1-180507 A | 7/1989 |
|----|------------|--------|
| JP | 2003-046184 | 2/2003 |
| JP | 2003-172856 | 6/2003 |
| JP | 2004-109256 A | 4/2004 |

OTHER PUBLICATIONS

Office Action (Decision of a Patent Grant) dated Feb. 28, 2012, issued in the corresponding Japanese Patent Application No. 2009-268774, and an English Translation thereof. (3 pages).

*Primary Examiner* — Evan Pert
(74) *Attorney, Agent, or Firm* — Buchanan Ingersoll & Rooney PC

(57) ABSTRACT

A light source manufacturing apparatus, which manufactures a light source device by adhering a laser device and a wavelength converting device that converts the laser light emitted by the laser device to laser light of a different wavelength, includes a first stage that holds the wavelength converting device, a second stage that holds the laser device, a power meter that measures the amount of laser light emitted by the wavelength converting device, a light receiving device that detects the drive waveform of the laser light, and a controlling unit that changes relative positions of the first stage and the second stage in such a manner that the amount of laser light measured by the power meter is a predetermined value or greater and the drive waveform detected by the light receiving device falls within a reference range.

4 Claims, 3 Drawing Sheets

APPARATUS AND METHOD FOR MANUFACTURING LIGHT SOURCE DEVICE

BACKGROUND OF THE INVENTION

1. Field of the Invention

The present invention relates to an apparatus and a method for manufacturing a wavelength conversion laser light source device.

2. Description of the Related Art

A wavelength conversion laser light source device is a light source (light source device) that is constituted by aligning a laser device that includes either an LD module or a solid laser or both of these elements and a wavelength converting device at a specific position. In such a light source device, a laser beam emitted from the laser device is incident onto the optical waveguide of the wavelength converting device (a second harmonic wave generation device, or an "SHG device", which emits a laser beam having a half the wavelength of the incident light, is adopted here) to generate high-power green light and blue light sources. The light source device resonates and amplifies the incident light inside the optical waveguide, and thereby generates and outputs a second harmonic having a half the wavelength of the incident light.

Optical connection establishing methods by which light emitted from the laser device is gathered onto the optical waveguide of the SHG device (by adjusting the position of the optical axis between the two optical devices) include passive alignment and active alignment. With the passive alignment, the positions of the optical devices are determined by performing image processing with reference to the outer shapes or target marks of the optical devices, or the adjustment positions are determined mechanically from the mutual engagement of the components. With the active alignment, a laser beam is incident onto the optical waveguide that is optically connected to the laser device, and the amount of the laser light output through the optical waveguide is measured by a power meter or the like. Thereafter, while measuring an amount of the output laser light, the laser device or the optical waveguide is three-dimensionally moved to find its optimal position at which the amount of laser light reaches the maximum value. Among such optical axis adjusting methods, the optimal method is selected in accordance with conditions such as the positioning accuracy of the optical devices included in the light source and a target optical output. After the optical axis is adjusted, the laser device and the SHG device are adhered to each other at the adjusted position with an adhesive or the like.

For example, according to the optical axis adjusting method suggested in Japanese Patent Application Laid-open No. 1-180507, optical fibers are moved in two directions orthogonal to the optical axis, in two planes orthogonal to each other that include the optical axis, and in two directions perpendicular to the optical axis direction, while monitoring the light passing through the optical fibers, in such a manner as to maximize the amount of light. A highly efficient optical connection can thereby be achieved between the semiconductor module and the optical fibers.

With the optical device adjusting method described in Japanese Patent Application Laid-open No. 2004-109256, the maximum value of the amount of light in the direction of the optical axis can be obtained from the values that periodically vary with changes of intervals between the optical devices, and by using the thus obtained maximum value, the optical axis is adjusted at a point where the amount of light reaches its maximum which is obtained in a state in which there is no reflection on the edge faces. BY this adjustment, the influence of interference of light reflected between the optical devices is eliminated.

When the optical axis is adjusted while monitoring the optical output as suggested in the above conventional technologies, however, unevenness in waveforms of the laser light may be observed when checked with an actual drive current actually flowing the adhered laser device. This occurs from a subtle positional displacement between the laser device and the SHG device that cannot be observed in the output fluctuation. For example, the laser outputs of the same level may come out with different drive waveforms. The conventional technologies have a problem of fluctuations in response characteristics of laser light when the drive waveform of the laser light varies for each laser light (when the variation of the waveform is large).

SUMMARY OF THE INVENTION

It is an object of the present invention to at least partially solve the problems in the conventional technology, and in order to solve the aforementioned problems, a light source manufacturing apparatus that manufactures a light source device by adhering a laser device and a wavelength converting device that converts laser light emitted by the laser device to laser light having a different wavelength, includes: a first stage that holds the wavelength converting device; a second stage that holds the laser device; a light amount measuring device that measures an amount of laser light emitted by the wavelength converting device; a light receiving device that detects a drive waveform of the laser light; and a controlling unit that controls relative positions of the first stage and the second stage in such a manner that the amount of laser light measured by the light amount measuring device is greater than or equal to a predetermined value and the drive waveform detected by the light receiving device falls within a predetermined reference range of a reference waveform or becomes a predetermined shape, and according to another aspect of the present invention, a light source manufacturing method has been provided.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an apparatus and a method for manufacturing a light source device according to the present invention are explained in detail below with reference to the attached drawings. The embodiments are not presented to limit this invention.

Figure 1:
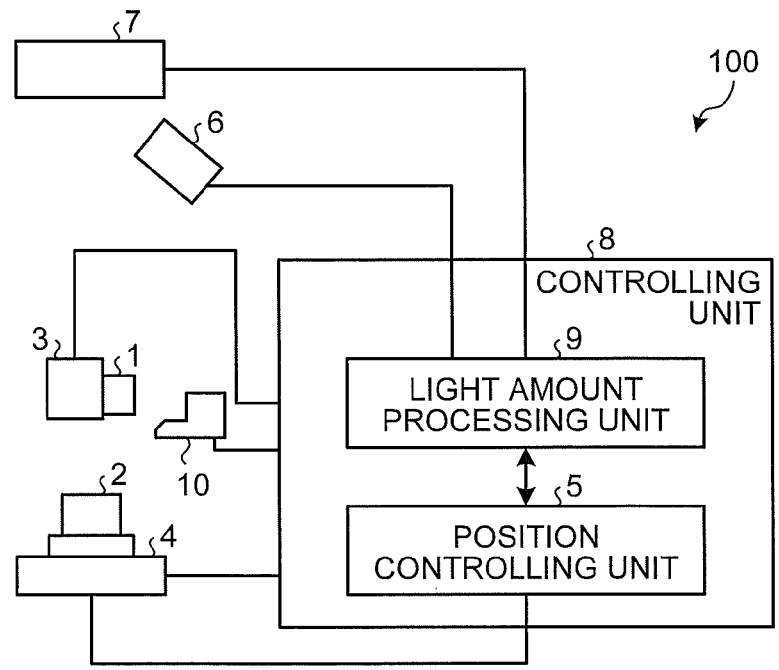
FIG. 1 is a diagram of the structure of a light source manufacturing apparatus according to an embodiment of the present invention.

FIG. 1 is a diagram of the structure of a light source manufacturing apparatus according to an embodiment of the present invention. In FIG. 1, a side view of a light source manufacturing apparatus (optical axis adjusting apparatus) 100 is illustrated. The light source manufacturing apparatus is configured to manufacture a wavelength conversion laser light source device (hereinafter, "light source L"). The light source L is incorporated in a projection television or the like, and produced by adhering a laser device 2 and a second harmonic generation (SHG) device 1, which is a wavelength converting device, to each other at a predetermined position. The light source manufacturing apparatus 100 according to the present embodiment establishes an optical connection by adjusting the optical axes of the laser device 2 and the SHG device 1.

The light source manufacturing apparatus 100 includes a fixed stage 3, a moving stage 4, a light receiving device 6, a power meter 7, a controlling unit 8, and a dispenser 10. The fixed stage 3 holds and secures the SHG device 1. The moving stage 4 is configured to be movable in three-dimensional directions, and holds the laser device 2.

The fixed stage 3 is arranged to support the SHG device 1 with its light-emission end surface (topside) facing the power meter 7 and its light-incidence bottom end surface (the surface to be adhered to the laser device 2) facing the laser device 2 arranged on the moving stage 4. The moving stage 4 is arranged to support the laser device 2 with its upper end (the surface to be adhered to the SHG device 1) facing the SHG device 1 arranged on the fixed stage 3. The fixed stage 3 is the first stage holding the SHG device 1, and the moving stage 4 is the second stage holding the laser device 2.

The power meter 7 is a light amount measuring device arranged above the light-emission end surface of the SHG device 1 to measure the amount of laser light (amount of output light) emitted from the SHG device 1. The power meter 7 sends the measured amount of laser light to the controlling unit 8.

The light receiving device 6 is arranged above the light-emission end surface of the SHG device 1 to detect the drive waveform of the laser light emitted from the SHG device 1. The drive waveform is a waveform obtained, for example, when the LD device (laser device 2) is driven by a pulse width control (duty ratio control). The light receiving device 6 receives the laser light output (emitted) from the SHG device 1 during the adjustment (alignment) of the optical axis, and converts the received amount of output laser light to an electric current to detect the drive waveform. The light receiving device 6 sends the detected drive waveform to the controlling unit 8.

The controlling unit 8 controls the fixed stage 3, the moving stage 4, the light receiving device 6, the power meter 7, and the dispenser 10. The controlling unit 8 includes a light amount processing unit (drive waveform processing unit) 9 and a position controlling unit 5. The light amount processing unit 9 receives, as the light amount information, the amount of light from the power meter 7 and the drive waveform from the light receiving device 6. The light amount processing unit 9 calculates the position to which the moving stage 4 is moved, based on the received light amount information, to instruct the position controlling unit 5. The position to which the moving stage 4 has been moved is where the laser device 2 and the SHG device 1 are brought to a suitable adhesion position. The suitable adhesion position of the laser device 2 and the SHG device 1 is determined from a position at which the drive waveform of the SHG device 1 falls within a predetermined range. According to the present embodiment, the laser device 2 and the SHG device 1 are arranged to be adhered to each other by adjusting the optical axis of the laser device 2 and that of the SHG device 1 in such a manner to bring the drive waveform of the SHG device 1 into a specific shape. The light amount processing unit 9 sends the calculated position for moving the moving stage 4 to the position controlling unit 5.

The position controlling unit 5 issues a moving instruction to the moving stage 4, in accordance with the position for moving the moving stage 4 received from the light amount processing unit 9. The moving instruction is given to the moving stage 4 so that, when the laser device 2 and the SHG device 1 are adhered to each other, the drive waveform of the SHG device 1 is brought to a shape in a specific range.

Furthermore, the controlling unit 8 controls the temperature of the SHG device 1 held by the fixed stage 3 and the temperature of the laser device 2 held by the moving stage 4. The fixed stage 3 and the moving stage 4 are provided with temperature regulating mechanisms (not shown) such as a heater. The controlling unit 8 controls the temperatures of the SHG device 1 and the laser device 2 by controlling these temperature regulating mechanisms.

The dispenser 10 applies an adhesive or the like to the adhesion portion of the laser device 2 and the SHG device 1. The dispenser 10 according to the present embodiment applies the adhesive to the adhesion portion of the laser device 2 and the SHG device 1, where the drive waveform of the SHG device 1 becomes a predetermined shape.

Figure 2:
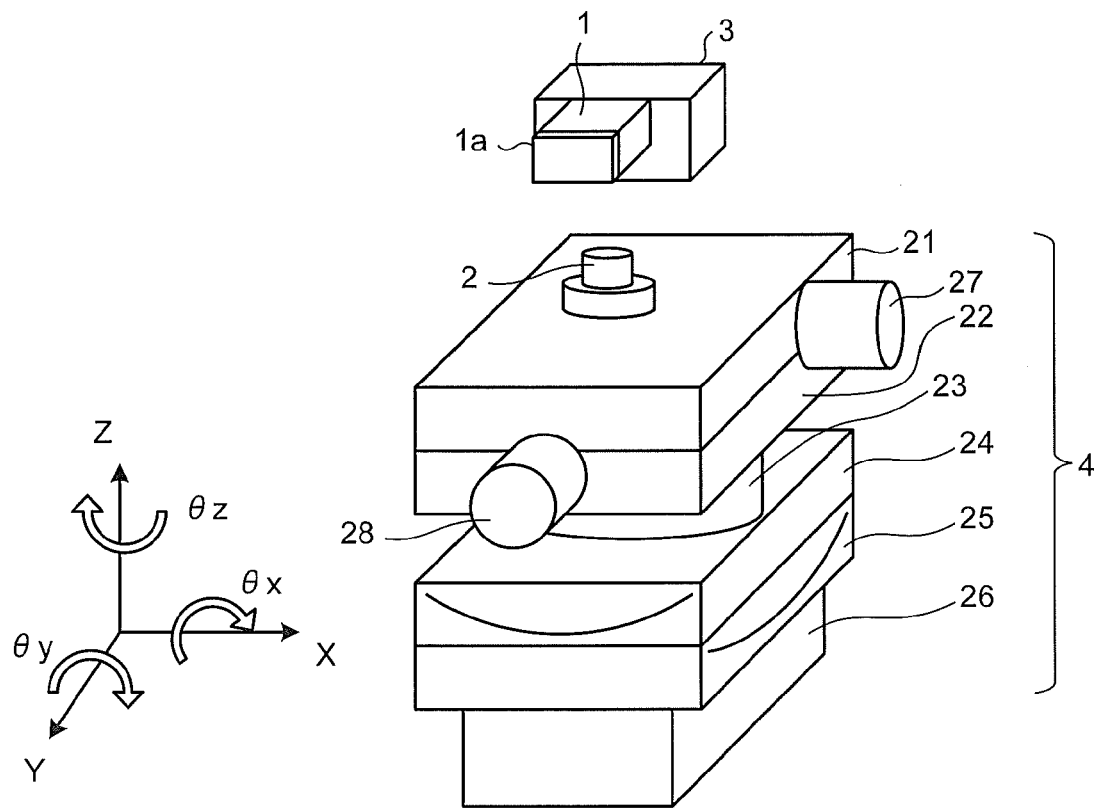
FIG. 2 is a diagram of the structure of a moving stage of the light source manufacturing apparatus according to the embodiment.

FIG. 2 is a diagram of the structure of the moving stage of the light source manufacturing apparatus according to the present embodiment. The moving stage 4 includes an X-axis stage 21, a Y-axis stage 22, a $\theta z$ stage 23, a $\theta y$ stage 24, a $\theta x$ stage 25, a Z-axis stage 26, and motors 27 and 28.

The X-axis stage 21 moves the moving stage 4 in the X-axis direction, the Y-axis stage 22 moves it in the Y-axis direction, and the Z-axis stage 26 moves it in the Z-axis direction. The $\theta z$ stage 23 rotates the moving stage 4 in the $\theta z$ direction, the $\theta y$ stage 24 rotates it in the $\theta y$ direction, and the $\theta x$ stage 25 rotates it in the $\theta x$ direction. The motor 27 is provided for the movement of the moving stage 4 in the X-axis direction, and the motor 28 is provided for the movement of the moving stage 4 in the Y-axis direction.

Next, the procedure for manufacturing the light source L performed by the light source manufacturing apparatus 100 is explained below. When manufacturing the light source L, the SHG device 1 is placed on the fixed stage 3, and the laser device 2 is placed on the moving stage 4, either manually or by a transporting mechanism (not shown).

Thereafter, the controlling unit 8 adjusts the temperatures of the laser device 2 and that of the SHG device 1. For example, the controlling unit 8 controls a temperature adjusting mechanism of the moving stage 4 to bring the temperature of the laser device 2 to $40\pm1°$ C. In this manner, the output ratio of the laser light emitted from the laser device 2 becomes 95% or higher. The output ratio here represents the ratio of the actual light output to the light output expected from its design (theoretical value). The controlling unit 8 also controls the temperature adjusting mechanism of the fixed stage 3 to bring the temperature of the SHG device 1 to 90±1° C., for example. The output ratio of the laser light from the SHG device 1 thereby becomes 95% or higher.

The temperature of the laser device 2 is not limited to 40±1° C. Furthermore, the temperature of the SHG device 1 is not limited to 90±1° C. For example, the temperature of the SHG device 1 may be set to 100° C. or 110° C., depending on the characteristics of the SHG device 1. The ranges of the temperatures of the laser device 2 and the SHG device 1 are determined in accordance with the acceptable range of the output ratio of the laser light.

Figure 3:
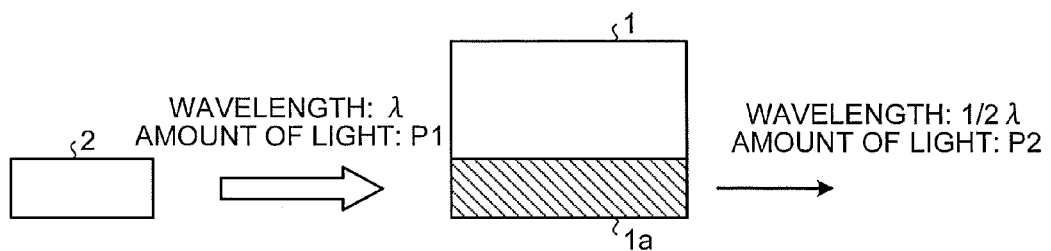
FIG. 3 is a diagram for explaining the relationship between incident light and output light of a laser device and an SHG device of a light source device manufactured by the light source manufacturing apparatus according to the embodiment.

FIG. 3 is a diagram for explaining the relationship between the incident light and the emitted light of the SHG device of the light source device manufactured by the light source manufacturing apparatus according to the present embodiment. The laser device 2 is composed of an LD module that emits excitation light and a solid laser that generates a fundamental wave of a specific wavelength in response to the excitation light from the LD module 201, resonates and amplifies the generated fundamental wave, and emits the resultant light. The laser device 2 and the SHG device 1 are adjusted to maintain at suitable temperatures, and the SHG device 1 is brought closer to the laser device 2, where the light emitted from the laser device 2 (wavelength λ, amount of light P1) is incident onto an optical waveguide 1$a$ of the SHG device 1, as illustrated in FIG. 3. Then, a second harmonic wave (wavelength λ/2, amount of light P2) having a half the wavelength of the light incident to the optical waveguide 1$a$ is emitted from the output side of the optical waveguide 1$a$ of the SHG device 1. The amount of light output from the optical waveguide 1$a$ is measured by the power meter 7. Because the drive waveform should be checked when the light output is sufficiently achieved, the light receiving device 6 does not conduct measurement before the position of the laser device 2 is not adjusted (i.e., the optical axes of the laser device 2 and the SHG device 1 are not aligned). In other words, the light receiving device 6 does not conduct the measurement when the output of the light from the SHG device 1 is not large enough.

Thereafter, while the moving stage 4 is being moved in a relative manner with respect to the fixed stage 3, the amount of light obtained by the power meter 7 and the drive waveform obtained by the light receiving device 6 are sent as light amount information to the light amount processing unit 9 of the controlling unit 8. The light amount processing unit 9 thereby moves the moving stage 4 by way of the position controlling unit 5, based on the light amount information received from the power meter 7.

More specifically, the light amount processing unit 9 sends the moving position of the moving stage 4 to the position controlling unit 5, based on the light amount information. The position controlling unit 5 issues a move instruction to the moving stage 4 to move to the position designated by the light amount processing unit 9, and thereby controls the position of the moving stage 4. In this manner, the controlling unit 8 causes relative movement to the moving stage 4 that holds the laser device 2, with respect to the fixed stage 3 that holds the SHG device 1. The controlling unit 8 adjusts the optical axis of the light source L by moving the laser device 2 until it reaches the position where the drive waveform of the SHG device 1 takes a predetermined shape.

When adjusting the optical axis of the light source L, the controlling unit 8 gives the laser device 2 subtle movements in six axial directions including the X-axis, Y-axis, and Z-axis directions and θx, θy, and θz directions, as illustrated in FIG. 2. In the adjustment of the optical axis, first, the position of the moving stage 4 is adjusted in the Y-axis and θz directions (the thickness direction of the optical waveguide 1$a$) so that a sufficient amount of light output from the laser device 2 would be incident onto the optical waveguide 1$a$ of the SHG device 1.

Then, the position of the moving stage 4 is adjusted in the Z-axis and θx directions to increase the efficiency of the resonance of the laser light inside the optical waveguide 1$a$ of the SHG device 1. Finally, the position of the moving stage 4 is adjusted in the X-axis and θy directions.

The light receiving device 6 measures the drive waveform at the relative positions of the laser device 2 and the SHG device 1 where the amount of light detected by the power meter 7 exceeds a predetermined value. The controlling unit 8 stores therein drive waveform data (reference waveform) for use as a reference, in advance. The light amount processing unit 9 judges whether the current Iw (maximum current) and the inclination of the rising edge (hereinafter, "initial gradient Aw") of the measured drive waveform satisfy the reference values (waveform standards). The reference values are determined in accordance with the reference waveform.

Figure 4:
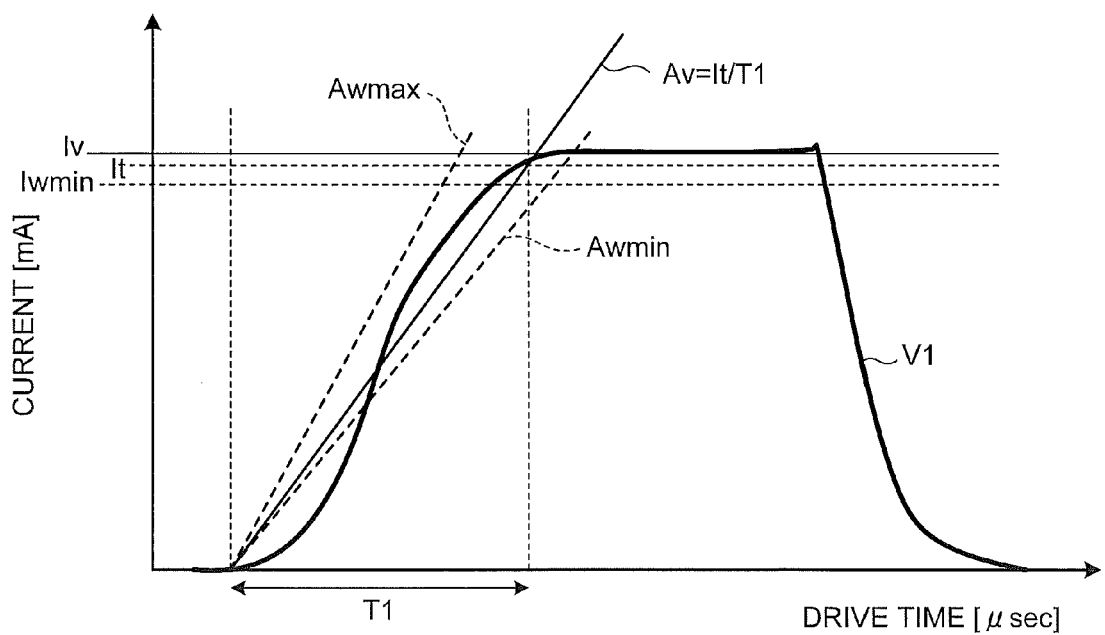
FIG. 4 is a diagram for explaining the relationship between the standard waveform and the initial gradient value that are adopted for the judgment as to whether the optical axis is suitably adjusted by the light source manufacturing apparatus according to the embodiment.

FIG. 4 is a diagram for explaining the relationship between the reference waveform and the initial gradient that are incorporated in the judgment as to whether the optical axis is suitably adjusted in the optical source manufacturing apparatus according to the present embodiment. The graph shown in FIG. 4 shows a reference waveform V1 produced when the device is driven under pulse width control (duty control with 30% duty ratio). The reference waveform is a current waveform in proportion to the amount of laser light detected by the light receiving device 6 during a period of time from the start to the end of the current supplied to the laser device 2 for one pulse, and corresponds to ON/OFF of the pulse. In the reference waveform, the current rises from zero at an initial gradient Av, and flows at the maximum current Iv for a certain period of time, and then falls back to zero. The initial gradient Av is a current It slightly smaller than the maximum current Iv (about 98% thereof, for example) divided by an elapsed time T1 from the start of light emission to the time at which the current reaches It. In other words, Av=It/T1 is established. The minimum value Iwmin of the maximum current value Iw of the drive waveform I, and the maximum value Awmax and the minimum value Awmin of the inclination of the rising edge, or in other words the initial gradient Aw, are defined for each reference waveform to determine whether a drive waveform I detected by the light receiving device 6 falls in a reference range of the reference waveform. For example, the definition may be Iwmin=0.95×Iv, Awmax=1.1×Av, and Awmin=0.9×Av.

The light amount processing unit 9 judges whether the maximum current Iw of the current I of the measured drive waveform is greater than the minimum current Iwmin. The light amount processing unit 9 also judges whether the initial gradient Aw of the measured drive waveform is in the range between the minimum value Awmin and the maximum value Awmax. The initial gradient Aw is obtained by an equation Aw=It2/Tw, where It2 is Iwmin or slightly smaller than Iwmin (98% thereof, for example), and Tw is an elapsed time from the start of the light emission to the time at which the current reaches It2. A condition for the elapsed time T may be incorporated in place of the initial gradient Aw.

Figure 5:
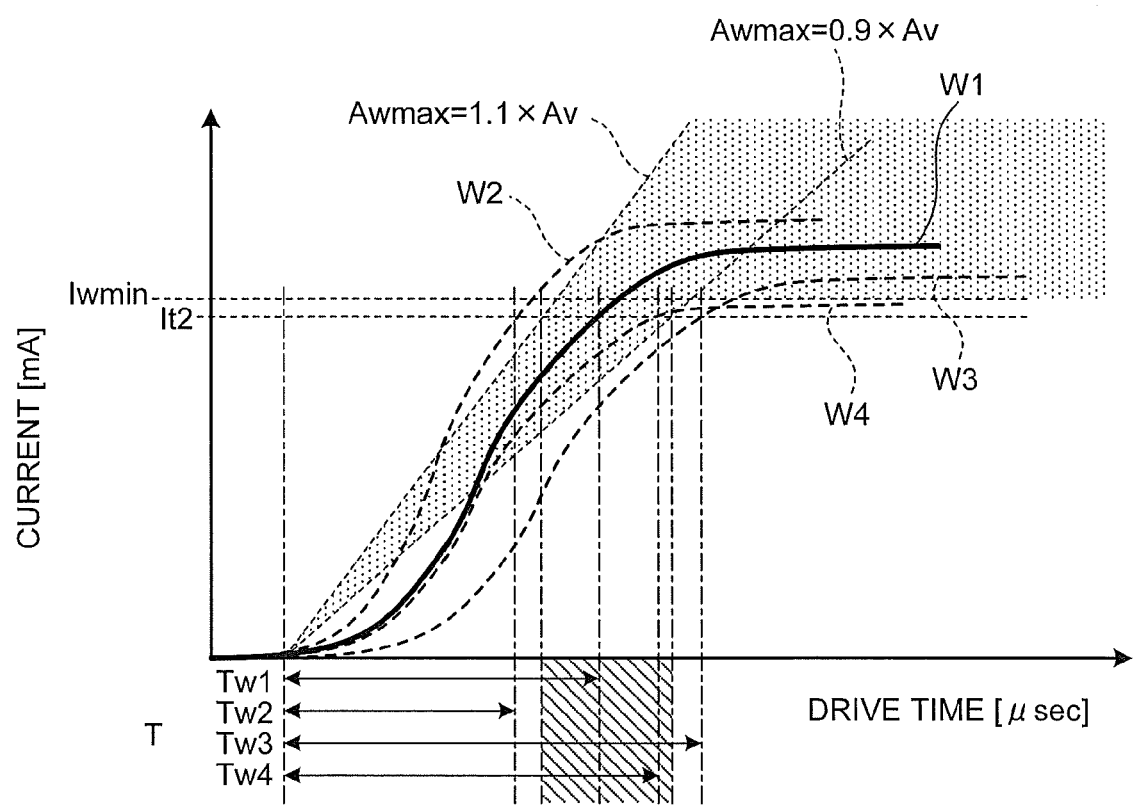
FIG. 5 is a diagram for explaining the judgment as to whether the optical axis is suitably adjusted by the light source manufacturing apparatus according to the embodiment of the present invention.

FIG. 5 is a diagram for explaining an example of judgment as to whether the optical axis is suitably adjusted in the light source manufacturing apparatus according to the present embodiment. The hatched area of this drawing represents an area of the drive waveform that is judged as being in the reference range. The drive waveform in the reference range is indicated by a solid line, whereas the drive waveform outside the reference range is indicated by dashed lines. The drive waveform W1 satisfies Iw>=Iwmin and Awmax>=Aw(=It2/Tw1)>=Awmin, and thus it falls within the reference range. As for the drive waveform W2, because Aw(=It2/Tw2)>Awmax, it is out of the reference range. The drive waveform W3 is out of the reference range because Aw(=It2/Tw3)<Awmin. The drive waveform W4 is also out of the reference range because Iw<Iwmin.

When the measured drive waveform does not satisfy the reference values, the laser device 2 is slightly moved again in any of the six axial directions including the X-axis, Y-axis, and Y-axis directions and θx, θy, and θz directions. For readjusting the optical axis, the moving stage 4 is moved in the Z-axis, θx, X-axis, and θy directions, which are axes related to the efficiency of the resonance inside the optical waveguide 1a. At this time, the amount of light is measured by the power meter 7 together with the drive waveform, and the optical axis is adjusted such that both the drive waveform and the amount of light (the relative positions of the laser device 2 and the SHG device 1) would be satisfied.

After the adjustment of the optical axis, the light source manufacturing apparatus 100 applies a suitable amount of adhesive or the like to the connecting portion of the laser device 2 and the SHG device 1 by use of the dispenser 10 or the like. The laser device 2 and the SHG device 1 are thereby firmly attached to each other. The dispenser 10 and the fixed stage 3 are both arranged above a position switching mechanism (not shown). At the step of adjusting the optical axis, the fixed stage 3 moves to a position above the laser device 2 to perform the optical axis adjusting process. Furthermore, at the time of attaching the laser device 2 and the SHG device 1 together, the dispenser 10 moves to a position above the laser device 2 to perform the adhering and fixing process.

When the measured drive waveform satisfies the reference values, an adhesive or the like is applied to the connecting portion of the laser device 2 and the SHG device 1 by use of the dispenser 10 or the like, without re-adjusting the optical axis, and the laser device 2 and the SHG device 1 are firmly attached to each other.

According to the present embodiment, it is explained in such a manner that the laser light is emitted from the SHG device 1 (optical axis direction) in a vertical direction when the optical direction is adjusted. However, the direction of the laser light emitted from the SHG device 1 may not be vertical (for example, it may be horizontal). According to the present embodiment, it is explained in such a manner that the optical axis is adjusted by placing the laser device 2 onto the moving stage 4, but the optical axis may be adjusted by moving the SHG device 1. Even in such a configuration, the rest of the structure and the operation is the same as in the light source manufacturing apparatus 100 illustrated in FIG. 1, and the same effects can be obtained.

Furthermore, the optical axis may be judged as being sufficiently adjusted, if the drive waveform produced after the adjustment of the optical axis falls in a predetermined reference range, and therefore the adjustment of the optical axis may be terminated even if the optical axis can be re-adjusted to further increase the amount of light.

According to the present embodiment, the SHG device 1 is adopted as a wavelength converting device. However, the wavelength converting device is not limited to a device that generates second harmonic waves, but may be a device that generates third or fourth harmonic waves.

According to the present embodiment, in which the optical axis is adjusted in accordance with the amount of light and the drive waveform (active alignment), a green light source or a blue light source can be obtained with reduced fluctuations in the responsiveness of the laser light.

Furthermore, after the optical axis is adjusted to have the power meter 7 detect the amount of light greater than or equal to the predetermined value, readjustment of the optical axis is conducted based on the drive waveform. Thus, the adjustment of the optical axis can be achieved in a short period of time.

According to the present invention, a light source device is manufactured by adjusting the optical axes of the laser device and the wavelength converting device to bring the drive waveform of the laser light into a predetermined reference range. Hence, a light source device that maintains the responsiveness of the laser light at a certain level can be manufactured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source manufacturing apparatus that manufactures a light source device by adhering a laser device and a wavelength converting device that converts laser light emitted by the laser device to laser light having a different wavelength, comprising:
    a first stage that holds the wavelength converting device;
    a second stage that holds the laser device;
    a light amount measuring device that measures an amount of laser light emitted by the wavelength converting device;
    a light receiving device that detects a drive waveform of the laser light; and
    a controlling unit that controls relative positions of the first stage and the second stage in such a manner that the amount of laser light measured by the light amount measuring device is greater than or equal to a predetermined value and the drive waveform detected by the light receiving device falls in a predetermined reference range.

2. The light source manufacturing apparatus according to claim 1, wherein the controlling unit changes the relative positions of the first stage and the second stage in such a manner that the light amount measuring device detects the amount of laser light greater than or equal to the predetermined value, and then changes the relative positions of the first stage and the second stage in accordance with the drive waveform.

3. The light source manufacturing apparatus according to claim 1, wherein the predetermined reference range is related to a maximum current value of the drive waveform and a gradient of a rising waveform of the drive waveform.

4. A method of manufacturing a light source device by adhering a laser device and a wavelength converting device that converts laser light emitted by the laser device to laser light having a different wavelength, comprising:
    a step of measuring an amount of laser light emitted by the wavelength converting device while moving the laser device in a relative manner with respect to the wavelength converting device;
    a step of adjusting positional relationship between the laser device and the wavelength converting device in such a manner that the amount of light indicates a predetermined value or greater;

a step of adjusting optical axes of the laser device and the wavelength converting device by adjusting the positional relationship between the laser device and the wavelength converting device in such a manner that a drive waveform of the laser light falls within a predetermined reference range; and a step of adhering the laser device and the wavelength converting device to each other at a position obtained by adjustment of the optical axes.

* * * * *